Jan. 13, 1942.      J. G. GIBSON      2,269,814
MEASURING INSTRUMENT
Filed March 3, 1941
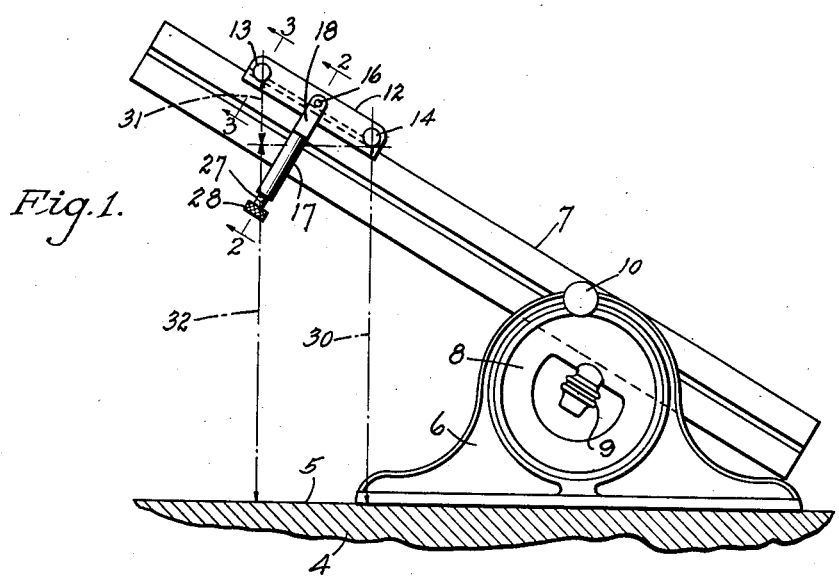
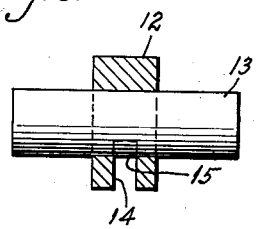
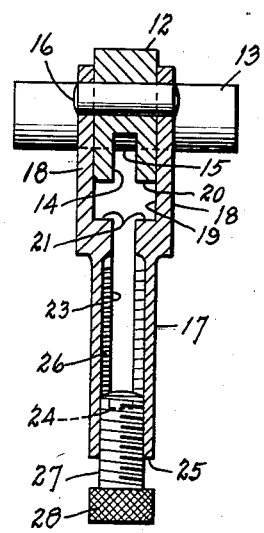
INVENTOR.
John G. Gibson
BY Carlos G. Stratton
ATTORNEY Patented Jan. 13, 1942

2,269,814

UNITED STATES PATENT OFFICE 2,269,814

MEASURING INSTRUMENT

John G. Gibson, Los Angeles, Calif.

Application March 3, 1941, Serial No. 381,418

9 Claims. (Cl. 33—102)

My invention relates to a measuring attachment, and more particularly to an attachment to facilitate the measuring of angles on the sine bar principle.

An important object of the invention is to provide means to calculate a given angle or to set an instrument, such as a bevel protractor, at a desired angle, more accurately than is possible with the naked eye.

Still another object is to provide a measuring attachment that will make a precision instrument out of an ordinary bevel protractor.

It is to be understood that the present invention is not limited to use upon a bevel protractor, but may be used on any means used for measuring angles.

My invention also has for its objects to provide such means that is positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is an elevation of my measuring attachment applied to the scale of a bevel protractor, showing same in an operative position.

Fig. 2 is an enlarged section taken on the line 2—2 of Fig. 1.

Fig. 3 is an enlarged section taken on the line 3—3 of Fig. 1.

Referring more in detail to the drawing, the reference numeral 4 designates a support having a flat surface 5. A bevel protractor is indicated generally by the numeral 6. A scale 7 is mounted on a circular, rotary member 8 of the protractor. The set screw 9 maintains the scale in lengthwise adjusted positions on the rotary member 8. A second set screw 10 holds the rotary member 8 and the scale 7 in rotated positions. Thus far is conventional construction.

My measuring attachment comprises a bar 12 provided with pins 13 and 14, which extend transversely through the bar 12 and project laterally from same. The pins preferably have been hardened and ground and have a light push fit. The under-side of the bar is grooved, as shown at 14, whereby to provide a slide groove for the bar 12 upon the scale 7. The pins 13 and 14 extend into the groove, as shown at 15, in order that the pins 13 and 14 may ride upon the edge of the scale 7. The very bottom of the groove 14 never engages the scale 7.

A pivot pin 16 pivotally connects an arm 17 to the bar 12. The arm 17 has substantially parallel side members 18 which swing on opposite sides of the bar 12. A space 19 is provided between the bottom 20 of the bar 12 and interior shoulders 21 of the parallel members 18.

The arm 17 has a slot 23 in which to receive the scale 7 of an angle measuring instrument. The bottom 24 of the slot 23 terminates inwardly from the outer face 25 of the arm 17. The arm 17 is tapped from the end face 25, as shown at 26, to receive a set screw 27 which has a knurled, manipulating head 28. The set screw 27 clamps the bar 12 on the scale 7. The pins 13 and 14 are a predetermined distance apart, such as two inches.

In the use of my present measuring instrument, a given angle may be calculated or the bevel protractor, or other angle measuring instrument, may be set at a desired angle by employing the sine bar principle in the following manner:

The measurements may be taken from similar points on the pins 13 and 14, such as the bottom, top, or even the center. In the present explanation the measurements are taken from the bottom of the pins. In calculating the angle of the scale 7 to the surface 5 or in setting the scale 7 at a desired angle to the surface 5, the distance from the pin 14 to the surface 5 is measured. This distance is represented by the broken line 30. Then the distance from the pin 13 to the surface 5 is measured. This distance is represented by the broken lines 31 plus 32. Then the shorter distance 30 is deducted from the longer distance 31 plus 32. The difference is the distance 31. If the distance between similar parts of the pins 13 and 14 is 2 inches, then the distance 31 is divided by 2. If the distance between similar portions of the pins 13 and 14 is 1 inch, then no such division is made. If still other distances are employed between similar portions of the pins 13 and 14, corresponding division or multiplication is employed.

The quotient obtained by dividing the distance 31 by 2 (when similar portions of the pins 13 and 14 are 2 inches apart) is the sine of the angle formed by the scale 7 and the surface 5. The number of degrees, minutes, and seconds of this angle are then readily determined by referring to conventional sine tables.

It is to be understood that accurate means should be employed for measuring the distances 30, 31 and 32. For instance, a height gauge and indicator are preferably employed to measure the distance 30 and the distance 31 plus 32.

The pins 13 and 14 are accurately positioned along the bar 12, say to ±.0001 part of an inch.

Since said measurements between the pins and the surface 5 are taken directly from the pins, the maximum of accuracy is obtained by having the pins bear directly upon the scale 7. It is to be understood that by measuring attachment may be slid onto either end of the scale 7.

My present device is a universal tool for obtaining accurate measurements by bevel protractors of different manufacturers, even though some of the protractors contain inaccuracies in their measuring means, and even though those inaccuracies have not yet been discovered.

While I have illustrated and described what I now regard as the preferred embodiment of my invention, the construction is, of course, subject to modifications without departing from the spirit and scope of my invention. For instance, the scale and my present attachment could be used apart from the remainder of the bevel protractor, such as by putting the scale on an angle plate. Moreover, it is believed clear without further illustration that the pins 13 and 14 may be shortened so that they only project laterally from one side of the bar 12. I, therefore do not wish to restrict myself to the particular form of construction illustrated and described, but desire to avail myself of all modifications which may fall within the scope of the appended claims.

Having thus described my invention, what I claim and desire to secure by Letters Patent is:

1. In a measuring attachment for a bevel protractor having a straightedge for engaging a flat surface on work and having a scale at an angle to said edge: a bar longitudinally slidable upon the scale, means to clamp the bar in adjusted positions along the scale, and laterally projecting pins on the bar disposed a predetermined distance apart along a line parallel with an edge of the scale for disposition at different distances from said work surface, to employ the sine bar principle in measuring the angle of the scale to said work surface.

2. In a measuring attachment for sliding along a straight edge of an angle measuring instrument having a therewith angularly arranged straightedge: a bar having a longitudinal groove for sliding the bar along one of the straight edges of said instrument, means to clamp the bar in adjusted positions on its engaged straightedge, and laterally projecting means on the bar disposed a predetermined distance apart in contact with said straight edge on which the bar is slidable for measuring their distances from the other straight edge from that along which the bar is slid.

3. In a measuring attachment for sliding along a straight edge of an angle measuring instrument having a therewith angularly arranged straightedge: a bar having a longitudinal groove receiving one straight edge, laterally projecting pins on the bar arranged across the groove in engagement at lengthwise spaced points with said straightedge whereby the bar may slide along a straight edge of said instrument by sliding the pins thereon, and means to clamp the bar in adjusted positions on its engaged straightedge.

4. A measuring attachment comprising a bar having a longitudinal groove, laterally projecting pins on the bar arranged across the groove inward of the outer edge of said groove to engage a straightedge extending through the groove, whereby the bar may slide along a straightedge by sliding the pins thereon and with the sides of the groove at opposite sides thereof, and means cooperating with said pins to clamp the bar in adjusted positions on its engaged straightedge.

5. In a measuring attachment for sliding along a straight edge of an angle measuring instrument having a therewith angularly arranged straightedge: a bar having a longitudinal groove for sliding the bar along one of the straight edges of said instrument, laterally projecting pins of substantially identical transverse dimensions disposed a predetermined distance apart transversely through the bar and its groove to rest on said straightedge for measuring their distances from the other straight edge from that along which the bar is slid, said predetermined spaced distance of the pins being relative to a conventional sine table.

6. A measuring attachment comprising a bar having a longitudinal groove receiving a straightedge, cylindrically shaped, laterally projecting pins of substantially identical radii disposed a predetermined distance apart transversely through the bar and its groove to rest on said straightedge for measuring their distances from a straight edge arranged angularly with respect to the groove of the bar, the circumference of the pins having a similar arrangement with respect to the bottom of the groove, said predetermined spaced distance of the pins being relative to a conventional sine table.

7. A measuring attachment comprising a bar having a longitudinal groove, a slotted arm pivoted on the bar, the arm being arranged for its slot to receive a straightedge disposed in the groove, and a set screw on the arm arranged to clamp the arm and thereby the connected bar upon the straightedge, the bar having fixed means transversely thereof in engagement at lengthwise spaced points along the straightedge for measuring the angle between the straightedge and a therewith angularly arranged straight edge, while the attachment is so clamped in position.

8. A measuring attachment comprising a bar having a longitudinal groove, a slotted arm pivoted on the bar, the arm being arranged for its slot to receive a straightedge disposed in the groove, a set screw on the arm arranged opposite the groove of the bar to bear upon the straightedge to push same into the groove, the bar having fixed means transversely thereof in engagement at lengthwise spaced points along the straightedge for measuring the angle between the straightedge and a therewith angularly arranged straight edge, while the attachment is so clamped in position.

9. A measuring attachment comprising a bar having a longitudinal groove, a slotted arm pivoted on the bar, the arm being arranged for its slot to be disposed opposite the groove of the bar, to receive a straightedge disposed in the groove, a set screw on the arm arranged opposite the groove of the bar to bear upon the straightedge, to push same into the groove, and cylindrical, laterally projecting, measuring pins of substantially identical radii disposed transversely of the bar at opposite sides of the pivotal connection of the arm with the bar, a portion of the circumference of the pins being arranged nearer the mouth of the groove than the bottom of the groove to engage the straightedge on which the bar is mounted, whereby the straightedge is clamped against the sides of the pins by the clamping action of the set screw.

JOHN G. GIBSON.